United States Patent [19]

Kreyenberg

[11] Patent Number: 4,879,048
[45] Date of Patent: * Nov. 7, 1989

[54] METHOD AND FACILITY FOR REMOVING SLUDGE FROM WATER

[76] Inventor: Heiner Kreyenberg, Waldseestr. 31, 4030 Ratingen 4, Fed. Rep. of Germany

[ * ] Notice: The portion of the term of this patent subsequent to Sep. 20, 2005 has been disclaimed.

[21] Appl. No.: 97,629

[22] Filed: Sep. 16, 1987

[30] Foreign Application Priority Data

Mar. 19, 1987 [EP] European Pat. Off. ........ 87104058.0

[51] Int. Cl.$^4$ .............................................. E01D 1/038
[52] U.S. Cl. ...................................... 210/768; 209/3; 209/10; 209/162; 210/788; 210/804; 210/806
[58] Field of Search ............................ 209/3, 10, 162; 210/768, 767, 769, 787, 788, 790, 800, 801, 803, 804, 805, 806; 175/65–67, 70, 38, 207, 209, 215, 217

[56] References Cited

U.S. PATENT DOCUMENTS 4,537,599 8/1985 Greenwald ........................ 209/162
4,624,327 11/1986 Reichman ............................ 175/67

FOREIGN PATENT DOCUMENTS 0152846 8/1985 European Pat. Off. .

OTHER PUBLICATIONS

Erzemetall, Bd. 30, Nr. 11, Nov. 1977, pp. 497–504, Jacobs et al; "Die indirekte Eisenerzflotation–über Erfahrungen . . . ".

Primary Examiner—Frank Sever
Attorney, Agent, or Firm—Becker & Becker, Inc.

[57] ABSTRACT

The present invention relates to a method incorporating a sorter, cyclone and thickener for removing sludge from water, and includes the step of separating the inorganic constituents or matter in the sludge, such as stones, gravel, sand, etc., from the organic constituents or matter thereof, such as wood, roots, etc. The inventive method is also suitable for processing sediment that contains decaying organisms.

7 Claims, 1 Drawing Sheet

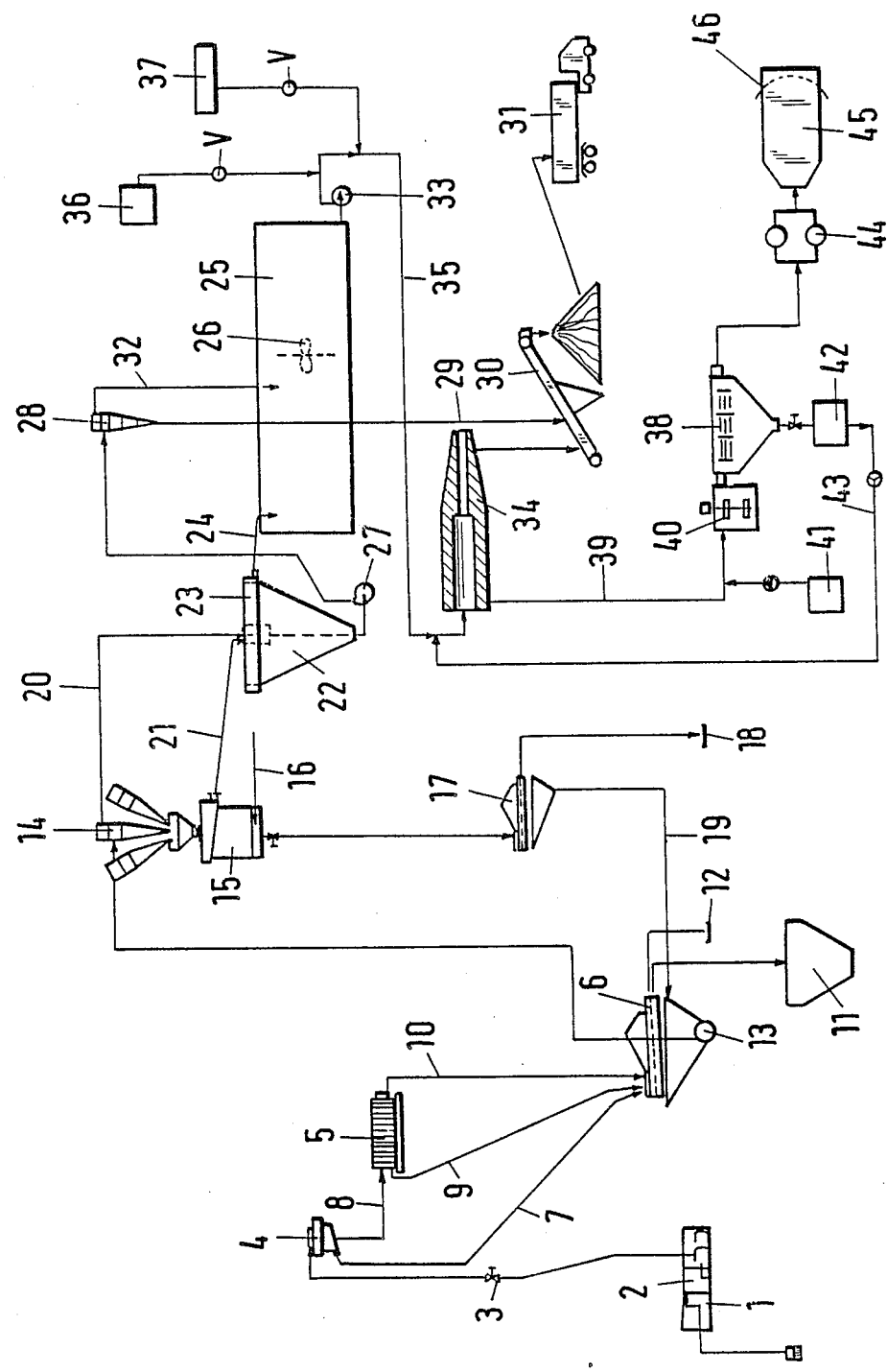

METHOD AND FACILITY FOR REMOVING SLUDGE FROM WATER

BACKGROUND OF THE INVENTION

Sludge that is removed from water contains a number of constituents that can be divided approximately into inorganic and organic constituents. The inorganic constituents are primarily stones, gravel, sand, etc., while the organic constituents include wood and roots. The organic constituents also include oils that have been introduced into the water and have contaminated the latter. The sludge furthermore includes chemical contaminants, such as phosphates that have been introduced into the water and have become dissolved therein.

The objective of removing sludge from water is to rid the water of these inorganic and organic constituents. Actually, the greater problem arises as to what to do with these constituents after they have been removed from the water. Since dumps are becoming continuously more scarce, a further objective during the removal of sludge from water must be the recovery of inorganic and organic constituents, such as stone, gravel, said, wood, roots, etc., and the subsequent use of such matter as economically usable material. It should be necessary to place only a fraction of this matter in dumps.

Applicant's copending U.S. patent application, Ser. No. 060,746 Kreyenberg, filed June 10, 1987, discloses a method and apparatus for removing sludge from water. The objective of the disclosure of copending application Ser. No. 060,746 Kreyenberg is to improve the heretofore known methods and apparatus for removing sludge from water in such a way that small quantities only have to be placed in dumps, and that the rest of the constituents of the sludge can be provided for subsequent use as economically usable material. The method of the disclosure of Ser. No. 060,746 Kreyenberg, which includes separating the inorganic constituents in the sludge from the organic constituents thereof, comprises three process stages. In a first stage, those constituents that are larger than a given size are separated out from the sludge, with inorganic and organic ones of these constituents being separated from one another, whereupon these constituents are cleaned and then provided for subsequent use. In a second stage, inorganic constituents that are larger than a minimum size are separated out from the remaining matter, are cleaned, and are provided for subsequent use. Finally, in a third stage, water is removed from the inorganic and organic slurry of the remaining matter to form a thick sludge and effluent, which are withdrawn and/or further processed.

A drawback of the above-referenced process for removing sludge from water is that in the second stage the fine inorganic constituents, i.e. the mineral constituents, can be separated from the fine organic constituents only with great difficulty. In the cyclone unit used in this second stage, the density of the fine constituents is too low to make it possible to satisfactorily sort and seaprate out the inorganic constituents. The cyclone unit is intended to separate off the inorganic constituents that are larger than 0.063 mm and to supply them, for example, to a sand deposit, while the inorganic constituents that are smaller than 0.063 mm are supplied to the third stage. However, the rising water in the cyclone forces the lightweight inorganic constituents from the head of the nozzle, resulting in the drawback that sand particles are also drawn out and supplied to the third stage. This cannot be avoided without a precise separation of densities; but this is not possible with a cyclone. The relatively large sand particles are thus carried out in the third stage with the slurry water. In addition, some of the erosive sand passes into the water-removal mechanism (in the form of a centrifuge) of the third stage, where the sand causes undue wear. In addition, sand that could have an economical use is lost.

Another drawback is that if the cyclone unit is overloaded, no fractionation takes place any more. Instead, the material is washed out from the bottom and top along with the overflow water, without fractionation, and is supplied to a collecting tank that is disposed ahead of the water-removal unit of the third stage. The result is that the collecting tank is gradually silted up. Furthermore, some erosive sand again enters the water-removal unit of the third stage, where it causes wear.

Proceeding from the above, it is an object of the present invention to eliminate the drawbacks that occur during the second stage of the aforementioned method for removing sludge from water. It is a further object of the present invention to provide a facility for carrying out this method.

BRIEF DESCRIPTION OF THE DRAWING

These and other objects and advantages of the present invention will be appear more clearly from the following specification in conjunction with the accompanying schematic drawing, which illustrates one preferred exemplary embodiment of the inventive facility for carrying out the method of the present invention for removing sludge from water.

SUMMARY OF THE INVENTION

THe method of the present invention is characterized by the steps of: in a first stage, separating out from the sludge those constituents that are larger than a given size, with the inorganic and organic ones of these larger constituents being separated from one another, cleaning these larger constituents, and providing them for subsequent use; in a second stage, separating out from the remaining matter inorganic constituents that are larger than a minimum size, cleaning these constituents, and providing them for subsequent use, whereby an inorganic and organic slurry is obtained during this second stage; thickening said inorganic and organic slurry that was obtained during the second stage; and further processing the thickened portions of the slurry.

Thickening the inorganic and organic slurry that was obtained during the second slurry stage provides the possibility for not having to supply the thus thickened portions, and hence in particular the sand, to the previously present third stage. Rather, the thickening provides the possibility for a different processing of the thickened portions of the slurry. On the whole, the process for removing sludge from water, and hence in particular for processing the sludge, is therefore simplified, whereby sand, which up to now was wasted due to the inadequate separating possibilities in the second stage, can now be supplied for economical further use.

Pursuant to a first inventive variant, the thickened portions of the slurry are supplied directly to a further conditioning unit, to a sludge reservoir, or to sludge-drainage land. The problem of economical usability of the thickened portions of the slurry is resolved if these thickened portions of the slurry are supplied to the further conditioning units. Where the thickened portions are conveyed to a sludge reservoir or to sludge-drainage land, dumping usually results.

In a second preferred inventive variant, the thickened portions of the slurry above a certain size are separated off from the portions below this size in order to recover constituents from which water has been mechanically removed. With this separation of solid particles from the suspension that originates from the thickener, said and silt can be recovered from which water is mechanically removed, and which are approximately 0.03 mm in size, whereby the slurry with constituents below this size can be supplied directly to a conditioning unit.

Pursuant to a preferred further development of this variant, any overflow quantities produced during this separation are returned to the thickening stage for renewed processing. This return provides a closed cycle that assures that even if the second stage is overloaded, a permanent separation of the constituents is possible without subjecting the further processing to material from the first stage, so that an otherwise threatening silting is avoided.

It is proposed pursuant to a further feature of the present invention that in a third stage, which follows the second stage, water is removed from the inorganic and organic slurry of the remaining matter from the second stage, and the thick sludge and effluent thus formed are further processed or withdrawn, whereby the lightweight and not thickened organic constituents of the slurry from the thickening stage between the second and third stages are supplied directly to the third stage, possibly after being temporarily stored. By disposing the known third stage after the second stage, the lightweight and not thickened organic constituents of the slurry from the thickening stage, which constituents cannot be thickened, are further processed in the known manner, thus further optimizing the sludge removal process.

Finally, pursuant to yet another feature of the inventive method, it is proposed that the thickened portions of the slurry, i.e. those portions above the give size that were separated off and mechanically had water removed therefrom, bypass the third stage and can be directly further processed together with the thick sludge from the third stage. In this way, a direct or indirect utilization of the thickened portions of the slurry is possible without having to include the third stage in the course of the process. Where appropriate quantities of silica are present in the sands and silt, the fine particles contained therein can be used during the manufacture of aerated concrete concrete. Use as a recultivating material is also possible.

The inventive facility for carrying out the method of the present invention includes a sludgeremoval apparatus and further comprises: a sorter for separating out constituents above a given size, and for separating inorganic and organic ones of these larger constituents from one another; a cyclone, disposed downstream of the sorter, for separating out from the remaining matter inorganic constituents that are larger than a minimum size; a thickener, disposed downstream of the cyclone unit, for the inorganic and organic slurry obtained from the cyclone unit; and withdrawal means for transporting, for further processing, those portions thickened in the thickener. The latter is preferably a compression thickener.

A thickener disposed within the overall facility in this manner has the advantage that it is possible therewith, in a technically straightforward manner, to thicken the inorganic and organic slurry obtained from the cyclone unit in the second stage and to supply this slurry for further processing without it being necessary for this purpose to undertake a large additional technical outlet.

A water-removal unit (a centrifuge) is preferably disposed downstream of the cyclone unit for removing water from the inorganic and organic slurry of the remaining matter from the cyclone unit to form a thick sludge, and the thickener advantageously has an overflow with a feed mechanism (a line) for the lightweight and not thickened organic constituents, with this feed line leading to the water-removal unit or to a collecting tank that is disposed ahead of the latter. Via this overflow, the lightweight and not thickened organic constituents, which cannot be thickened, can be supplied to a third stage, in the form of the water-removal unit, which possibly has a collecting tank disposed ahead of it.

In a preferred embodiment, to further process the constituents that are thickened in the thickener, it is proposed that a hydro-cyclone be disposed downstream of the thickener for those thickened constituents of the slurry originating from the thickener for recovering constituents from which water has been mechanically removed and which are above a certain size. In this hydro-cyclone, the solid particles from the suspension that originates from the thickener can be separated out in order to recover sand and silt from which water has been mechanically removed, whereby the above-referenced particle sizes can, for example, be 0.03 mm, with those constituents that are smaller than this size being adapted to be supplied to the water-removal unit or to a collecting tank disposed ahead of the latter.

It is finally proposed pursuant to the present invention that a return mechanism be disposed between the hydro-cyclone and the thickener for overflow quantities that are produced in the hydrocyclone. As a result of this return mechanism, a closed cycle is formed that has the advantage that even when the cyclone of the second stage is overloaded, it is possible to have a separation in this second stage without possibly contaminating and silting the collecting tank that is disposed ahead of the water-removal unit of the third stage.

Further specific features of the present invention will be described in detail subsequently.

DESCRIPTION OF PREFERRED EMBODIMENTS

Referring now to the drawing in detail, the illustrated facility includes a sludge-withdrawal apparatus 1, for example in the form of a cutting head suction dredger. This withdrawal apparatus 1 is equipped with a stone-collecting basket 2 that has, for example, a mesh or screen aperture of 100 mm, and hence traps matter that is larger than 100 mm.

Via the interposition of a volume regulator 3 for supplying the facility, the sediment suspension is supplied to a first separation stage, which comprises a screen cyclone 4, a washing drum 5, and a vibratory classifier or sorter 6. A separation of larger inorganic and organic matter above a given size, for example 6 mm, from finer matter, for example below 6 mm, takes place in this first separation stage. A preliminary water separation and a preliminary screening of the larger matter above 6 mm takes place in the screen cyclone 4, so that the preliminarily separated-off water with finer matter below 6 mm is withdrawn via a line 7 and is supplied to the vibratory sorter 6. The solid suspension from which water has been removed in the screen cyclone 4, and which contains the larger matter, is supplied via a line 8 to the washing drum 5, which is provided with baffle plates. The latter baffle plates effect a separation of the larger organic matter (wood, roots, etc.) from the larger inorganic matter (stones, gravel, sand, etc.), with the discharge from the washing drum 5 being effected separately via the line 9 (for organic matter) and the line 10 (for inorganic matter). A further, not-indicated line leads from the washing drum 5 to the vibratory sorter 6, with this line conveying finer matter under 6 mm from the washing drum 5 to the sorter 6.

The vibratory sorter 6 comprises four runs, namely a first run for the preliminarily separatedoff water and the preliminarily screened-off matter from the line 7, a second run for the inorganic matter from the washing drum 6 via the line 10, a third run for the organic matter that also comes from the washing drum 5 via the line 9, and a fourth run for the fine matter below 6 mm from the washing drum 5 via the non-indicated line. The first and fourth runs with the fine matter below 6 mm can also be combined.

The larger matter is carried back and forth several times on the runs of the vibratory sorter 6 and is separated from fine organic and mineral particles. This is particularly applicable for the large organic matter to wash therefrom fine particles that might be contaminated with heavy metals. The thus cleaned organic matter is conveyed from the appropriate run of the vibratory sorter 6 to a container 11, from where the wood and the roots are supplied for combustion, for example for producing energy, or are supplied for the production of composts. The large inorganic matter is similarly conveyed, after being cleaned, to a gravel deposit 12 that contains stones larger than 6 mm. Just like the wood and the roots, the gravel from the deposit 12 can also be supplied for subsequent use.

Via a feed pump 13, the fine inorganic and organic matter of a size below 6 mm are supplied in suspension to a (multi-) cyclone unit 14. A separation of sand having a size between a minimum of 0.063 and 6 mm is to take place in this cyclone unit 14. Disposed downstream of the cyclone unit 14 is a heavy-medium sorter 15 that has an inlet 16 for fresh water or water from a water main, with this water conveying the cleaned sand via a vibratory water remover 17 to a sand deposit 18, which contains said having a size below 6 mm. The filtrate water from the vibratory water remover 17 is returned to the vibratory sorter 6 via a line 19.

The fine mineral constituents below 0.063 mm that cannot be separated out in the cyclone unit 14, as well as the fine organic constituents, are conveyed via a line 20 (for mineral slurry) and a line 21 (for organic slurry, sludge water) to a concentrator or thickener 22, which in the illustrated embodiment is in the form of a compression thickener. After the mineral and organic slurries enter the thickener 22, they become dispersed. The lightweight organic constituents collect in an overflow 23 of the thickener 22 and are supplied via a line 24 to a collecting tank 25 that is provided with a homogenizer 26. The constituents are not withdrawn via the overflow 23, namely the sand and the silt, settle in the thickener 22, are withdrawn from the lower end of the thickener via pump 27, and are supplied to a hydro-cyclone 28. To recover sand and silt having a particle size of greater than 0.03 mm, and from which water has been mechanically removed, the solid particles from the suspension that originates from the thickener 22 are separated out in the cyclone 28. The sand and silt are supplied via a line 29 to a conveyer belt 30 that delivers the sand and silt to a truck 31, whereupon the sand and silt can be taken to a dump, used to produce composts, burned, etc. The slurry with constituents smaller than 0.03 mm is conveyed from the cyclone 28, via a line 32, to the collecting tank 25.

The thickener 22 takes into account the fact that in the cyclone unit 14, the inorganic constituents (sand) are not separated out in an optimum fashion. Practice has shown that the rising water from the head of the nozzle forces the relatively lightweight mineral constituents to the overflow of the cyclone unit 14. As a result, sand particles greater than 0.063 mm are drawn out by the water and are carried off via the line 20 without being supplied, as intended, to the sand deposit 18. Via the thickener 22 and the hydrocyclone 28, these retained mineral constituents are subsequently separated out and supplied for further use without passing into further stages of the process, which begin with the collecting tank 25.

Thus, the collecting tank 25 contains only particles that are smaller than 0.063 mm. From there, the slurry is transported further via a feed pump 33 to a water-removal unit in the form of a centrifuge 34, which forms the third separation stage, after the cyclone unit 14, which forms the second separation stage. This third separation stage after the cyclone unit 14 is not absolutely necessary, in other words, in principle the first two separation stages together with the thickener 22 suffice to bring about the desired result.

Disposed in the line 35 between the collecting tank 25 and the centrifuge 34 is a precipitation station 36 which, by adding ferrous sulfate or ferric chloride sulfate, precipitates the phosphates dissolved in the water and converts them into solids that can settle out.

Also disposed in the line 35 between the collecting tank 25 and the centrifuge 34 is a neutralization station 37 which, by the addition of, for example, a lime solution, deacidifies and hence neutralizes the water, and at the same time aids in sedimentation. Here also a solid is precipitated that can settle out.

A removal of water from the mineral and organic slurries, as well as from the precipitants from the stations 28 and 29, is effected in the centrifuge 34. The dense or thick sludge thus obtained is delivered to a truck 31, for example via a conveyer belt 30, whereupon this sludge, like the sludge and silt from the hydrocyclone 28, can be taken to a dump, used to produce composts, burned, etc.

The effluent (water main) from the centrifuge 34 is finally conveyed to a lamination or sheet clarifier 38 via the line 39, with a coagulator 40 being disposed ahead of the clarifier 38. Also disposed in the line 39 is a counter-coagulation station 41. The sludge concentrate 42 obtained in the clarifier 38 is returned to the centrifuge 34 via a line 43 and the line 35, so that the sludge concentrate 42 again passes through the third stage and can be separated out via the centrifuge.

After passing through a filter 44, the effluent from the clarifier 38 is introduced into the trench 45 of a main channel; an oil barrier 46 can be provided for this trench. From there, the effluent is returned to the body of water from which the sludge was originally withdrawn. The filter 44 is intended to rid the effluent of suspended particles and floating material. The filter can, for example, be a sand filter or a solid-body filter. This considerably reduces the chemical oxygen demand (C.O.D.).

The facility just described can be fixedly constructed. However, it is also possible to make the facility mobile; in other words, the facility can be transported to wherever it is needed. In such a case, the facility is a single compact apparatus that contains all of the components.

The present invention is, of course, in no way restricted to the specific disclosure of the specification and drawing, but also encompasses any modifications within the scope of the appended claims.

What I claim is:

1. A method of removing from a body of water sludge that contains water, inorganic constituents, and organic constituents with which a problem arises as to what to do with this matter of constituents after removal thereof from the water since dumps are becoming more scarce so that this problem is met in such a way that the rest of the constituents of the sludge can be provided for subsequent use as economical material, said method including steps of separating the inorganic constituents in the sludge, comprising stones, gravel and sand, from the organic constituents thereof, comprising wood and roots, said method further comprising: minimizing the volume of said sludge to be disposed in said dumps by effecting in sequence the steps of:

recovering said inorganic constituents for economic use by providing a sorter in a first stage and separating out from said sludge those constituents that are larger than a given size, with inorganic and organic ones of these larger constituents being separated from one another, cleaning these larger constituents, and providing them for subsequent use as economically usable material to avoid the problem of placement thereof in dumps;

recovering said organic constituents by providing a cyclone unit in a second stage and separating out from the remaining matter inorganic constituents that are larger than a minimum size, cleaning these constituents, and providing them for subsequent use also as economically usable material to avoid the problem of placement thereof in dumps, whereby from the further remaining matter an inorganic and organic slurry is obtained directly during said second stage;

providing a thickener, disposed downstream of said cyclone unit, for thickening said inorganic and organic slurry obtained during said second stage; and further depositing the thickened portions of said slurry in at least one of said dumps.

2. A method according to claim 1, which includes the step of conveying said thickened slurry portions directly to a further conditioning unit.

3. A method according to claim 1, which includes the step of conveying said thickened slurry portions directly to a sludge reservoir or the sludge-drainage land.

4. A method according to claim 1, which includes the step of separating thickened slurry portions above a certain size from portions below this size to recover constituents from which water has been mechanically removed.

5. A method according to claim 4, which includes the step of returning any overflow quantities produced during said separating step for reprocessing.

6. A method according to claim 1, which includes the step of providing a third stage downstream of said thickening step for receiving from the latter lightweight and not-thickened organic constituents from said slurry thereof for removing water therefrom to form a thick sludge and effluent.

7. A method according to claim 6, which includes the step of further processing the thickened portions of said slurry from said thickening step together with said thick sludge from said third stage.

* * * * *